(12) United States Patent
Haag et al.

(10) Patent No.: US 11,181,412 B2
(45) Date of Patent: Nov. 23, 2021

(54) GAS METER CONTAMINATION FILTERING DEVICE

(71) Applicant: Itron Global SARL, Liberty Lake, WA (US)

(72) Inventors: Christian Oskar Haag, Philippsburg (DE); Pierre Roesch, Oberhausen-Rheinhausen (DE); Tobias Kirsten, Eggenstein-Leopoldshafen (DE)

(73) Assignee: Itron Global SARL, Liberty Lake, WA (US)

( * ) Notice: Subject to any disclaimer, the term of this patent is extended or adjusted under 35 U.S.C. 154(b) by 201 days.

(21) Appl. No.: 16/678,607

(22) Filed: Nov. 8, 2019

(65) Prior Publication Data

US 2020/0149944 A1    May 14, 2020

Related U.S. Application Data

(60) Provisional application No. 62/758,566, filed on Nov. 10, 2018.

(51) Int. Cl.
| | |
|---|---|
| *G01F 15/12* | (2006.01) |
| *B01D 45/08* | (2006.01) |
| *G01F 15/14* | (2006.01) |
| *G01F 15/18* | (2006.01) |

(52) U.S. Cl.
CPC ............ *G01F 15/12* (2013.01); *B01D 45/08* (2013.01); *G01F 15/14* (2013.01); *G01F 15/185* (2013.01)

(58) Field of Classification Search
None
See application file for complete search history.

(56) References Cited

U.S. PATENT DOCUMENTS

| | | | |
|---|---|---|---|
| 1,989,773 | A | 5/1935 | Sonnenberg et al. |
| 9,671,269 | B2 | 6/2017 | Berger |
| 2012/0118407 | A1 | 5/2012 | Sonnenberg et al. |
| 2016/0109274 | A1 | 4/2016 | Berger |

FOREIGN PATENT DOCUMENTS

| | | |
|---|---|---|
| FR | 2776379 | 9/1999 |
| WO | WO2012169202 | 12/2012 |

OTHER PUBLICATIONS

The PCT Search Report and Written Opinion dated Feb. 25, 2020 for PCT Application No. PCT/US2019/060550, 12 pages.

*Primary Examiner* — Harshad R Patel
(74) *Attorney, Agent, or Firm* — Lee & Hayes, P.C.

(57) ABSTRACT

A decontamination device removes particles from a gas flow and is usable in a gas metering device. The decontamination device may include an upper portion defining a plurality of openings and a lower portion attached to the upper portion. In an example, the lower portion includes a first curved ramp to redirect the gas flow and a plurality of fingers in a path of the redirected gas flow. First and second flow pipes receive incoming gas and bifurcate the gas flow, which is redirected at the first curved ramp. The fingers contact and remove particles in the redirected gas flow. A second curved ramp may include at least one hole to bifurcate the gas flow into a first gas flow passing through the at least one hole and a second gas flow redirected by the second curved ramp to pass through the plurality of openings defined in the upper portion.

20 Claims, 11 Drawing Sheets

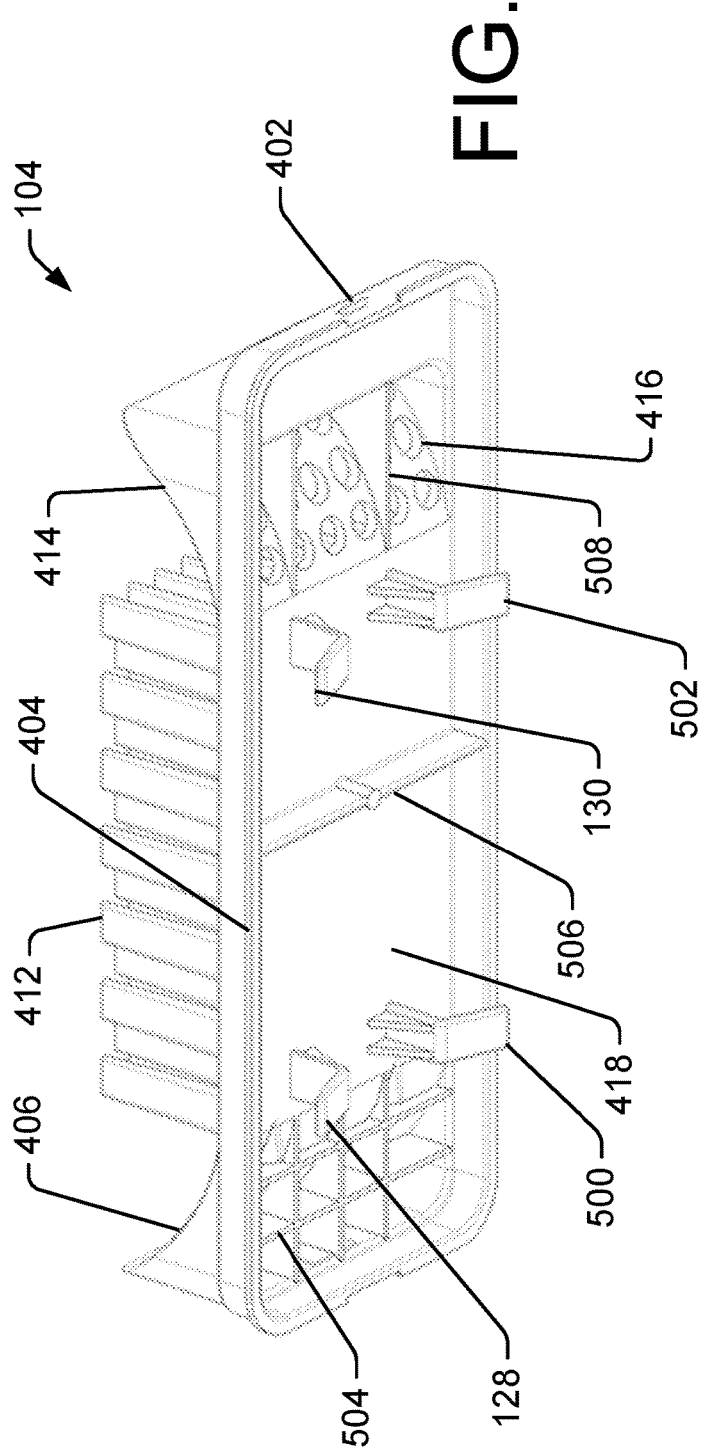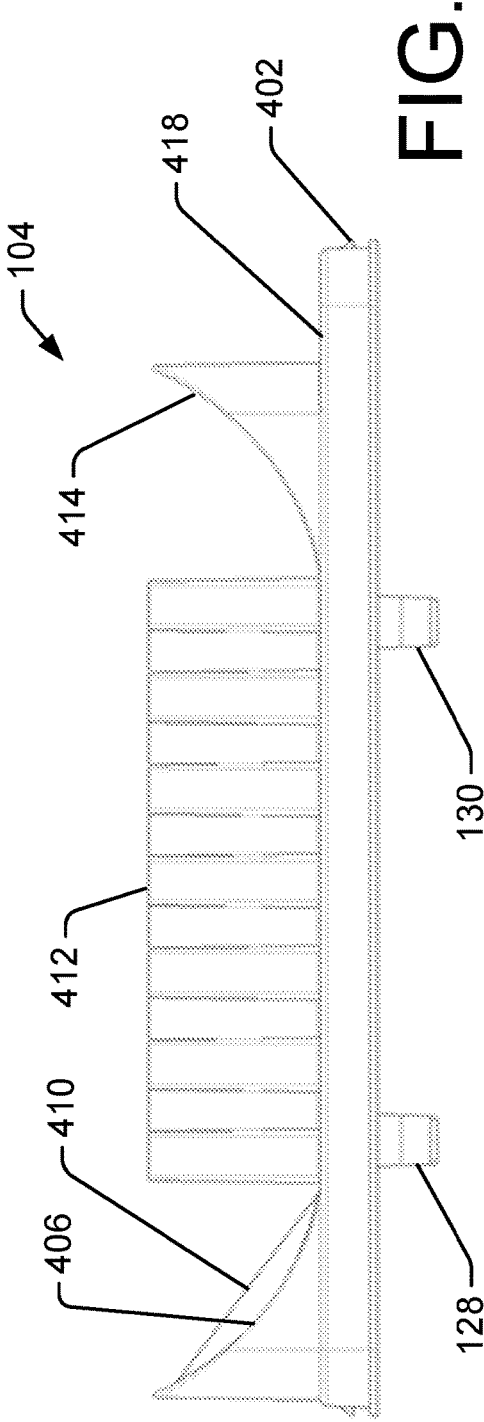

GAS METER CONTAMINATION FILTERING DEVICE

RELAYED APPLICATIONS

This patent application claims priority to U.S. patent application Ser. No. 62/758,566, titled "Gas Meter and Particle Trap", filed on 10 Nov. 2018, commonly assigned herewith, and hereby incorporated by reference.

BACKGROUND

Particle traps for removing foreign matter from natural gas or other fluid flows advantageously clean the gas flow before transportation, measurement and/or use. However, known filters may be prone to clogging and to increasing gas pressures by resisting the free movement and flow of the gas. Accordingly, improved particle traps and gas meters would result in the availability of better products for utility companies, and to improved service to gas customers.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 5 is a perspective view of a lower surface of the lower portion of the particle trap for a gas meter.

FIG. 6 is an orthographic side view of the lower portion of the particle trap for a gas meter.

DETAILED DESCRIPTION

Overview

Techniques for removing particles from a gas flow may be performed within a gas meter, in or in conjunction with gas transmission pipes, or other locations. In an example, a particle trap removes particles from a gas flow and is usable in a gas metering device. The particle trap may include an upper portion defining a plurality of openings and a lower portion attached to the upper portion. In an example, the lower portion includes a first curved ramp to redirect the gas flow and a plurality of fingers in a path of the redirected gas flow. First and second flow pipes receive incoming gas and bifurcate the gas flow, which is redirected at the first curved ramp. The fingers contact and remove particles in the redirected gas flow. A second curved ramp may include at least one hole to bifurcate the gas flow into a first gas flow passing through the at least one hole and a second gas flow redirected by the second curved ramp to pass through the plurality of openings defined in the upper portion.

In operation, gas enters the particle trap and slows somewhat, due to an increased cross-sectional area of flow. Particles collide with the fingers or other structures within the particle filter and fall out of the flow. The gas flow then exits the filter trap, after which it is measured by a metrology device before leaving the gas meter.

U.S. Pat. No. 9,671,269, issued 6 Jun. 2017, having title "Gas Meter and Particle Trap", having application Ser. No. 14/896,875, having publication number 2016/0109274, and having publication date 21 Apr. 2016, is incorporated herein by this reference.

Example System and Techniques

Figure 1:
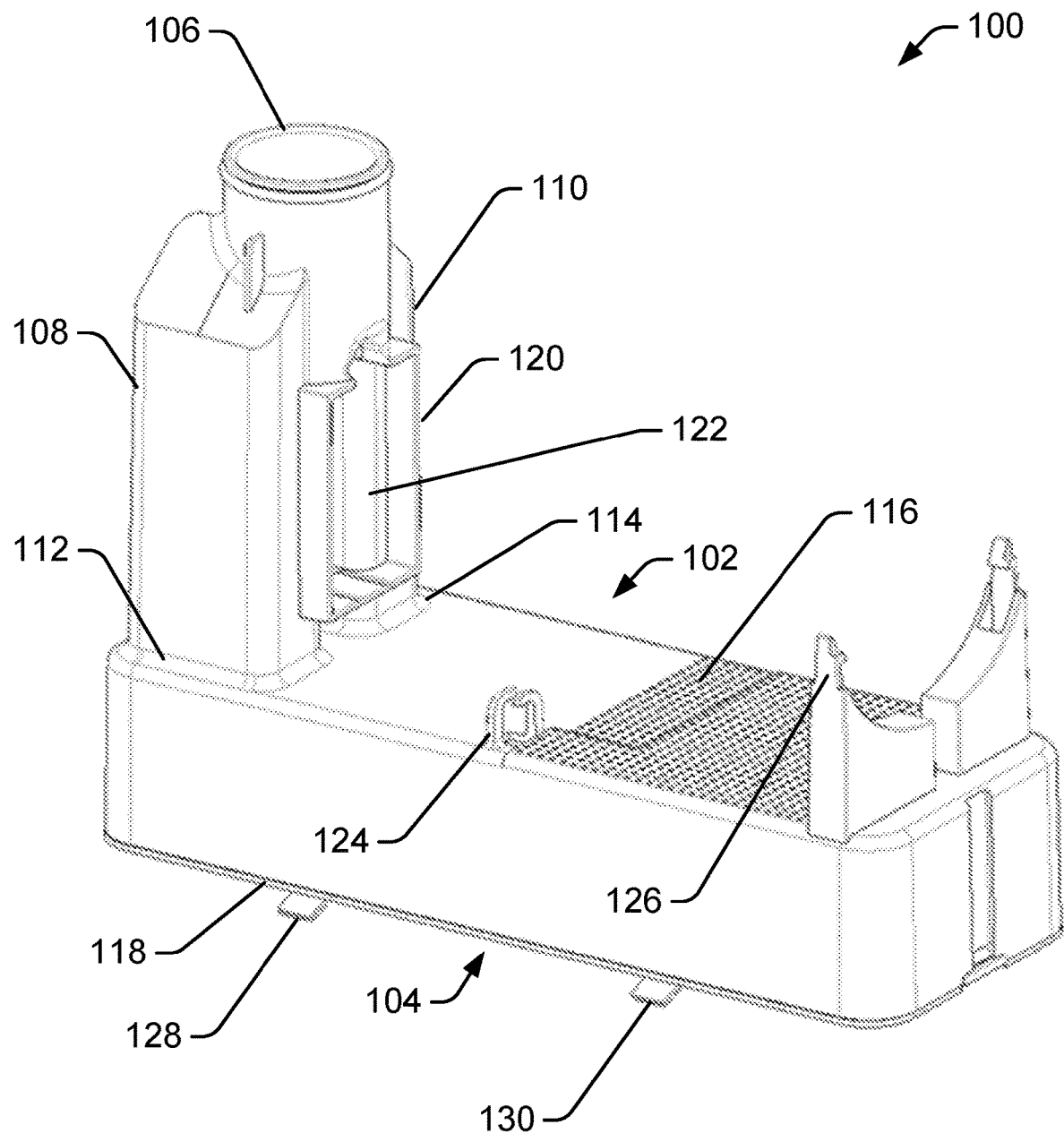
FIG. 1 is a perspective view of an example particle trap.

FIG. 1 shows an example particle filter, trap and/or gas meter flow straightener and decontamination device 100, for use in a gas meter, gas pipeline, etc. In the view shown, the upper portion 102 of the particle trap is shown, while the lower portion 104 is substantially obscured by the upper portion. In the example shown, the upper portion 102 and the lower portion 104.

Figure 13:
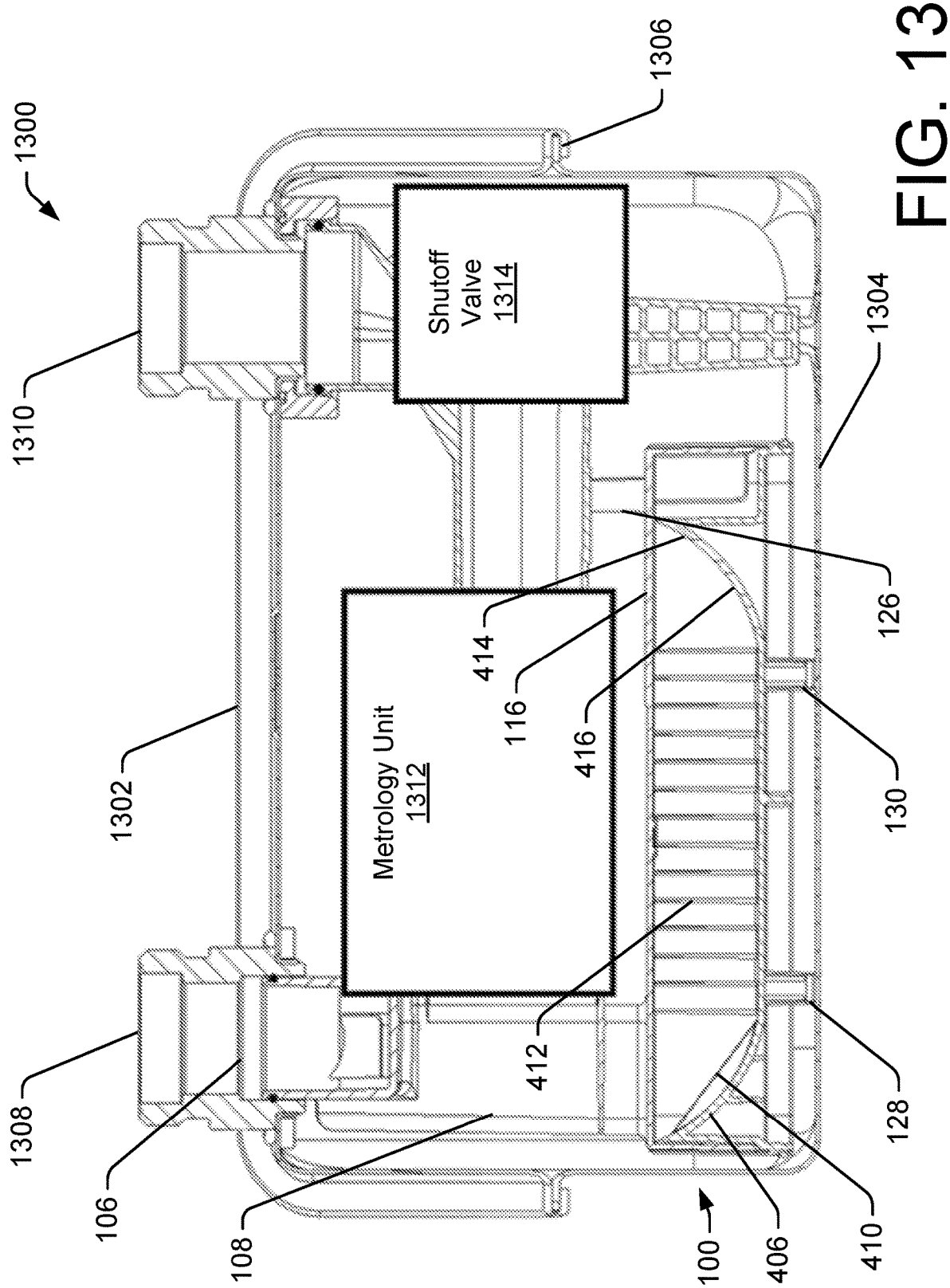
FIG. 13 is a cross-sectional view of a gas meter, showing the particle trap within an enclosure of the gas meter.
Figure 14:
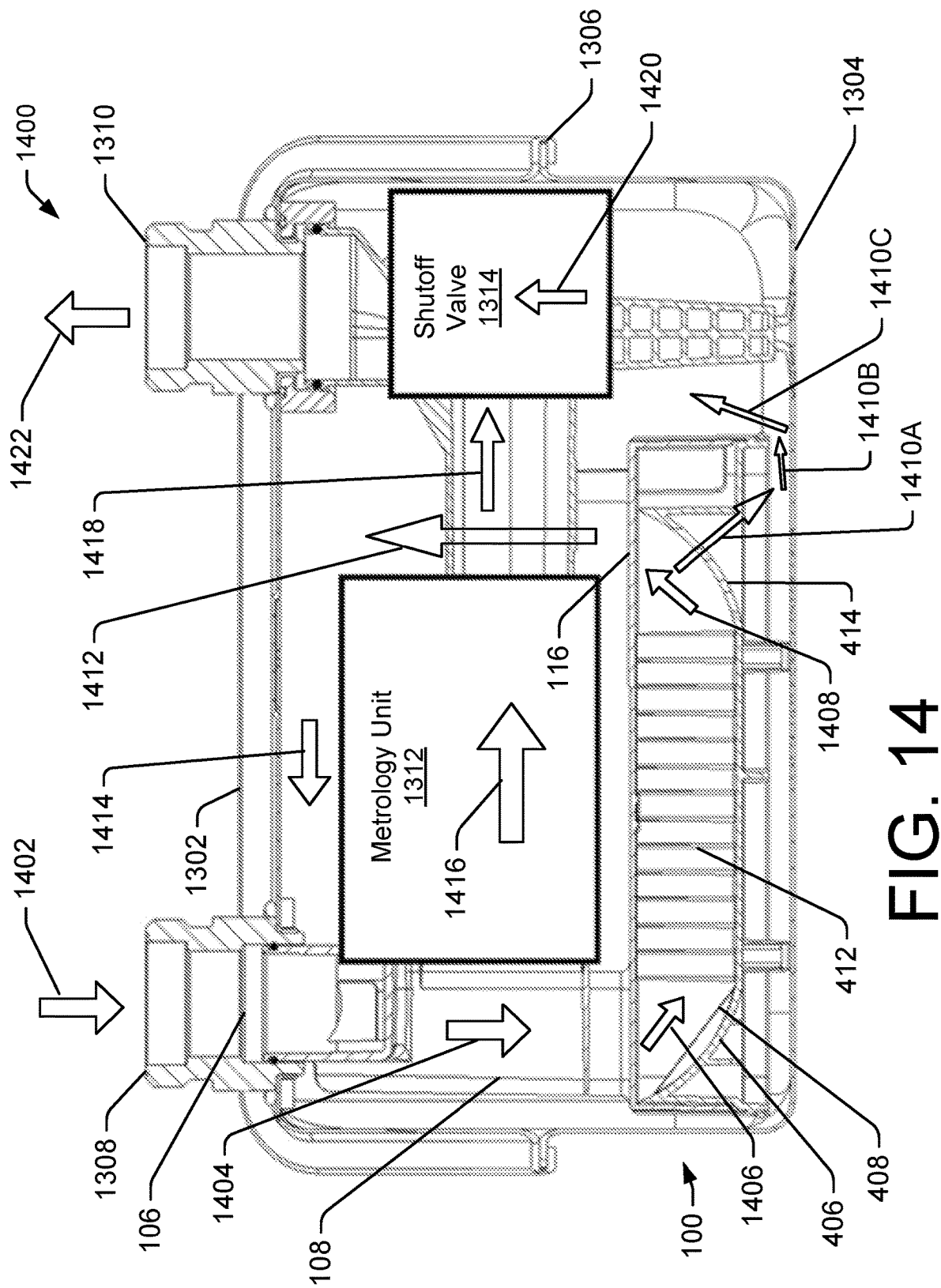
FIG. 14 is a cross-sectional view of a gas meter, showing example gas flow through components of the meter.

A gas pipe 106 is adapted for connection to a pipe providing gas flow to a gas meter. Accordingly, gas is cleaned prior to measurement by a metrology unit (e.g., as seen in FIGS. 13 and 14). Gas entering the pipe 106 is divided, with half flowing through each of two parallel passageways, defined by a first flow pipe 108 and a second flow pipe 110. In the example shown, the two flow pipes 108, 110 have a fillet transition 112, 114 to the surface of the upper portion 102 of the particle trap 100.

The parallel passages (or pipes) 108, 110 assist in creating a laminar flow within the particle trap, which is consistent with particles dropping out of the flow and being retained by the particle trap. In operation, gas from both pipes 108, 110 enters a cavity within the particle trap 100.

Gas may exit from the particle trap 100 at an exit or exhaust grill 116. Gas will exit at grill 116 after having dropped many of the particles originally carried by the gas flow. Gas may exit from the particle trap 100 at other locations, such as the hole(s) 416 (see FIG. 4) or a gap 118 (if present) at a seam between the upper portion 102 and the lower portion 104. Such leakage at the seam is not detrimental, because the particle trap is located within an enclosure of a gas meter (as seen in FIGS. 13 and 14).

A metrology unit support bracket or mounting feature 120 allows attachment of a metrology unit (shown in FIGS. 13 and 14). Gas within an enclosure of a gas meter (not shown) passes through a passage 122 between the two pipes 108, 110 and into the metrology unit supported by the mounting bracket 120.

A wiring restraint 124 allows wiring to the metrology unit (not shown) to be secured.

A gas pipe support-stand 126 is configured to support a gas pipe (not shown) that conducts gas leaving the metrology unit.

Figure 4:
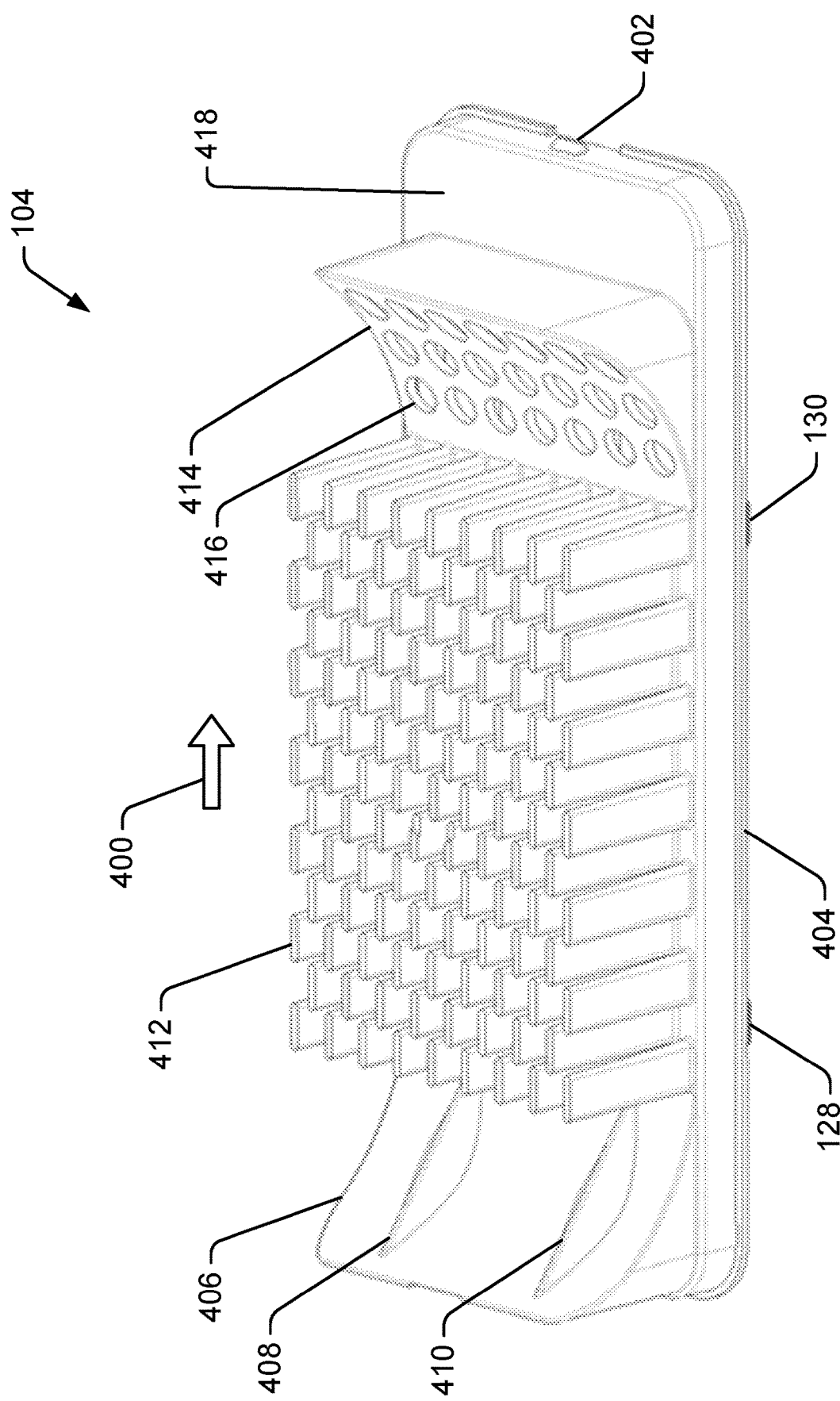
FIG. 4 is a perspective view of an upper surface of the lower portion of the particle trap for a gas meter.

In the example shown, a passage 122 is defined between the pipes 108, 110. The passage 122 allows gas to flow from within the enclosure of the gas meter (within which the particle trap is located) into the metrology unit (not shown) carried by the support bracket 120. Accordingly, in the example shown gas enters pipe 106, passes through one of the pipes 108, 110, assumes a generally laminar flow, and passes through the body of the particle trap 100, and exits through the grill 116 and potential other openings 416 (as seen in FIG. 4). The body of the particle trap is the assembled upper portion 102 and lower portion 104. Gas flows within the interior of the gas meter, passing through opening 122 and into the metrology unit (not shown) supported by support bracket 120.

Two feet 128, 130 of the lower portion 104 of the particle trap 100 are seen. The feet support the particle trap 100 on an interior surface of a gas meter (now shown). The feet 128, 130 may be flexible and/or resiliently deformable, to allow for some movement of pipes and wiring, particularly during manufacturing and/or installation. In an example, the particle trap 100 may have four, eight or a different number of feet.

Figure 2:
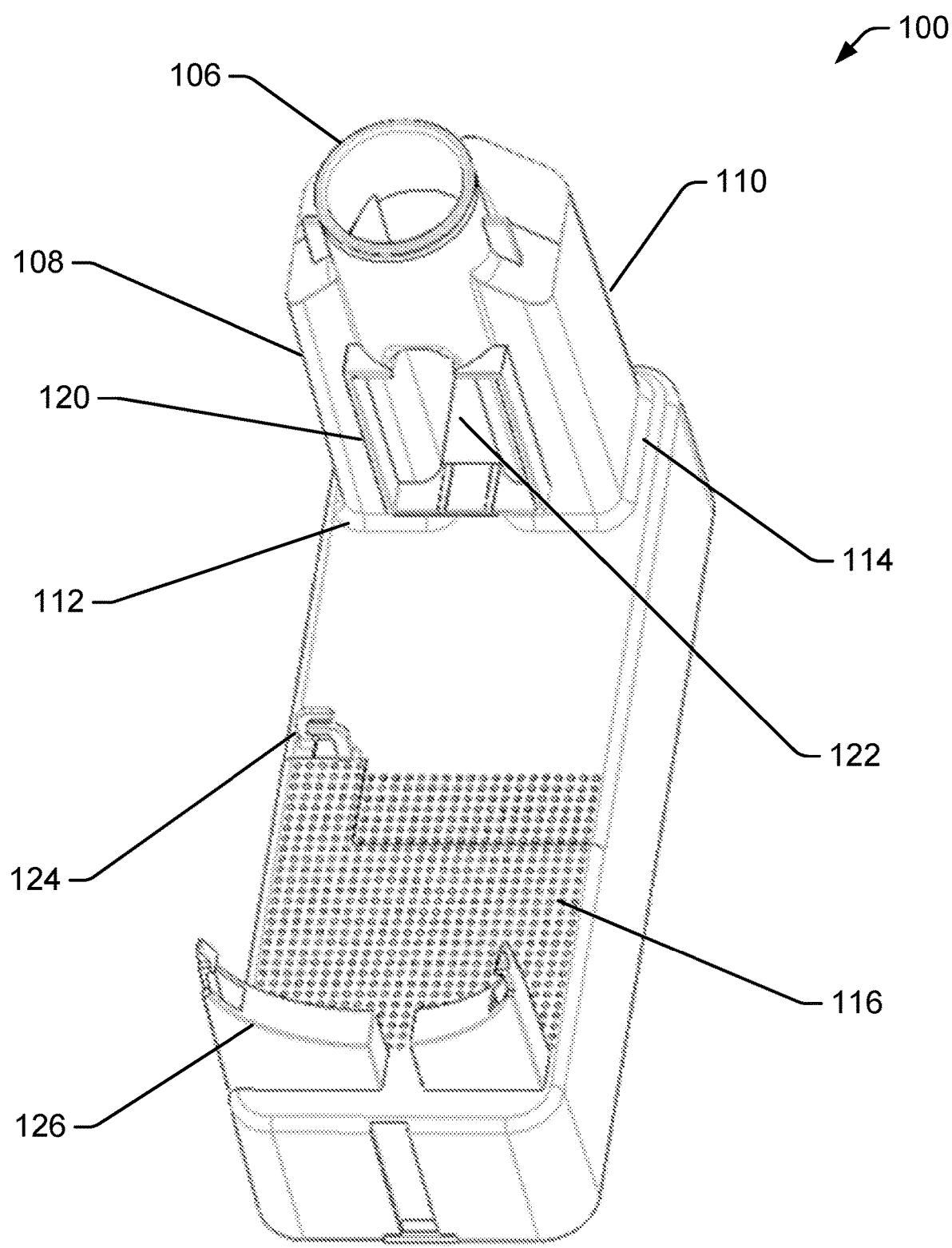
FIG. 2 is a perspective view of the example of an upper portion of a particle trap for a gas meter.

FIG. 2 shows the example particle trap 100 in an orientation that better shows the passage 122 between the pipes 108, 110. The incoming pipe 106 is configured to receive gas flow into the particle trap, and to route the gas flow into first and second flow pipes 108, 110. The body of the particle trap is shown, defining the grill 116 through which gas exits. The body also supports the wiring restraint 124 and gas pipe support stand 126.

Figure 3:
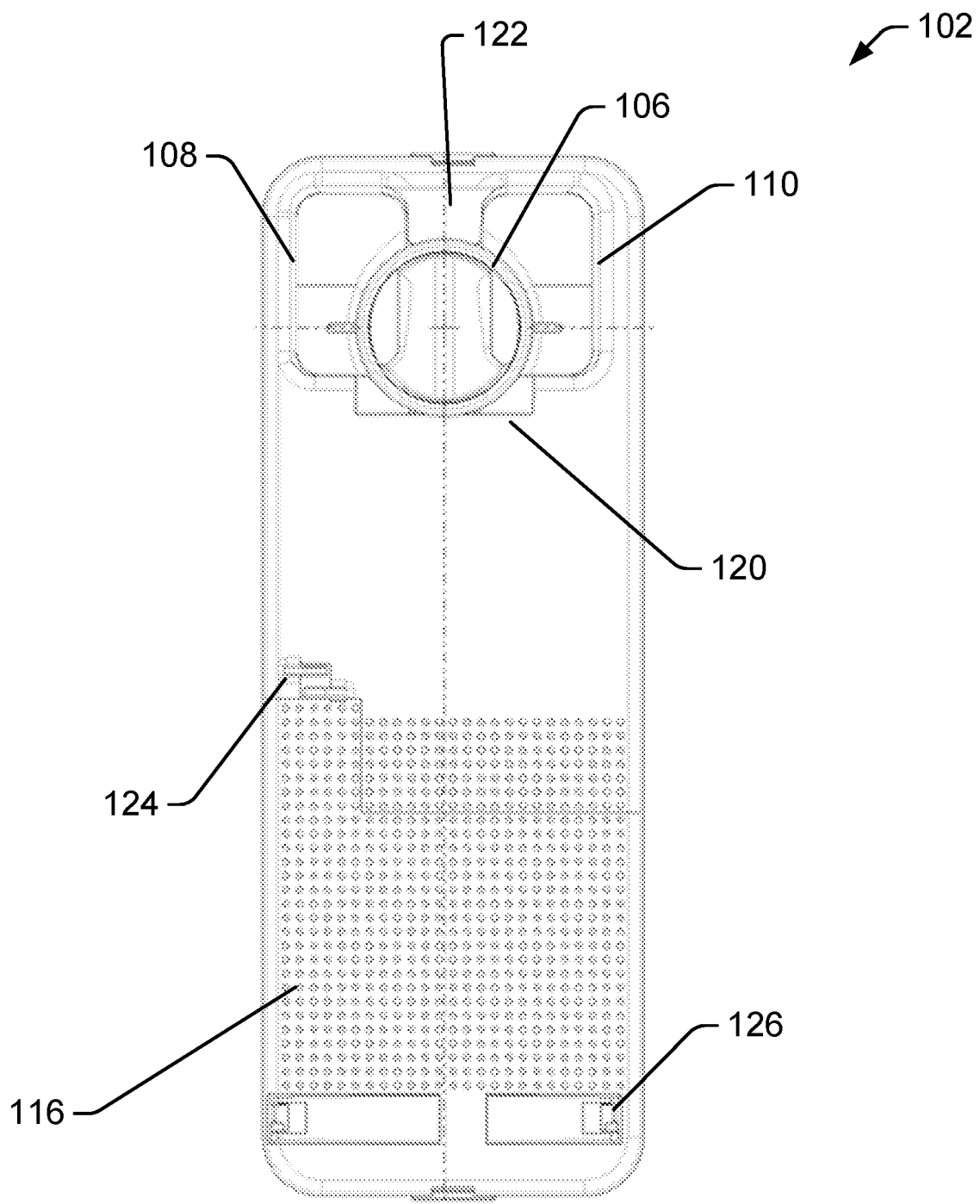
FIG. 3 is an orthographic view of an example of an upper surface of an upper portion of a particle trap for a gas meter.

FIG. 3 shows the upper surface of the upper portion 102 of a particle trap. In the example, the upper rim of the input pipe 106 is seen. Gas flow received by the input pipe is bifurcated and flows through parallel pipes 108, 110, which tend to promote a more laminar flow within the body of the particle trap. The gas exit or exhaust grill 116 includes number of holes defined in the upper surface of the upper portion 102. The support bracket 120 for a metrology unit is shown, but the metrology unit (seen in FIGS. 13 and 14) is not shown for clarity. The wiring restraint 124 is shown, which can secure wiring to the metrology unit. The gas pipe support-stand 126 is shown, but the pipe it supports (seen in FIGS. 13 and 14) is not shown for clarity.

In operation, gas exits the grill 116 into the enclosure of a gas meter. Gas from within the enclosure passes between the pipes 108, 110 at space 122, through a metrology unit supported by bracket 120, through a pipe supported by support-stand 126, and exits the gas meter.

FIG. 4 shows an example of the lower portion 104 of the particle trap. In the orientation shown, gas flows generally in the direction 400 and only a small portion of each of two feet 128, 130 is seen. The lower portion 104 fits into the upper portion (e.g., seen in FIG. 1). In the example, the lower portion 104 has a connector 402 which "snaps" into a corresponding connector of the upper portion (better seen in FIGS. 10 and 11). A rim 404 of a base 418 contacts a perimeter of the upper portion. The connection between the upper portion 102 and the lower portion 104 does not have to be gas-tight, since any leakage of gas would be contained within the enclosure of the gas meter (seen in FIGS. 13 and 14).

Gas flows exiting the parallel pipes (108, 110, seen in FIG. 1) contact the first curved ramp 406, which redirects the gas flow by approximately 90-degrees. While the ramps are shown as curved, they may include one or more planar surfaces, which change the direction of the gas flow.

One or more flow distributors or flow guides may be present. In the example shown, two flow guides 408, 410 are located on the first curved ramp. The flow guides 408, 410 are oriented in a lengthwise manner, to orient an axis of each flow guide in a general direction of gas flow 400. Accordingly, a length of each flow guide is oriented in a direction of gas flow and the length is greater than a width of each flow guide.

A plurality of a plurality of fingers 412 are included in the lower portion 104. The fingers 412 are in a path of the gas flow, as redirected by the first curved ramp. In operation, the fingers 412 contact particles and remove particles in the redirected gas flow. In an example, each of the plurality of fingers 412 has a height, a length in a direction of the gas flow, and a width perpendicular to the gas flow. In the example shown, the height is greater than the length, and the length is greater than the width.

In operation, gas flow may be slowed somewhat by the fingers, and particles (e.g., dust, soot, dirt, etc.) may fall out of the flow. Such particles may stick to the fingers, which may become somewhat dirty over time. Other particles may fall to the base 418 to which one or more fingers are attached.

A second curved ramp 414 redirects gas flow to the grill or plurality of openings 116 (seen in FIG. 1) defined in the upper portion. The second curved ramp 414 may have at least one hole 416 defined in its surface. The at least one hole 416 bifurcates the gas flow into a first gas flow passing through the at least one hole and a second gas flow redirected by the second curved ramp to pass through the plurality of openings 116 defined in the upper portion 102. Gas flowing into the holes 416 tends to slow down, and particles may drop out of the flow. In some examples, gas may move in both directions through one or more of the holes 416.

FIG. 5 shows a lower surface of the lower portion 104 of the particle trap for a gas meter. The first curved ramp 406, plurality of fingers 412, and second curved ramp 414 are shown. A plurality of holes 416 are defined in the second curved ramp. The rim 404 of the base is shown and is sized to fit against a similar rim of the upper portion 102 (not shown in this view). The feet 128, 130, 500, 502 provide support for the particle trap within an enclosure of a gas meter. A support structure 504 strengthens the first curved ramp 406 and ensures proper handling in production (prepared for atomization processes). A supporting beam 506 strengthens the base 418 of the lower portion 104. Supporting beams 508 strengthens the second curved ramp 414. The supports 504, 506, 508 are examples of strengthening structures, and alternative designs could be substituted.

FIG. 6 shows a side view of the lower portion 104 of the particle trap for a gas meter.

Figure 7:
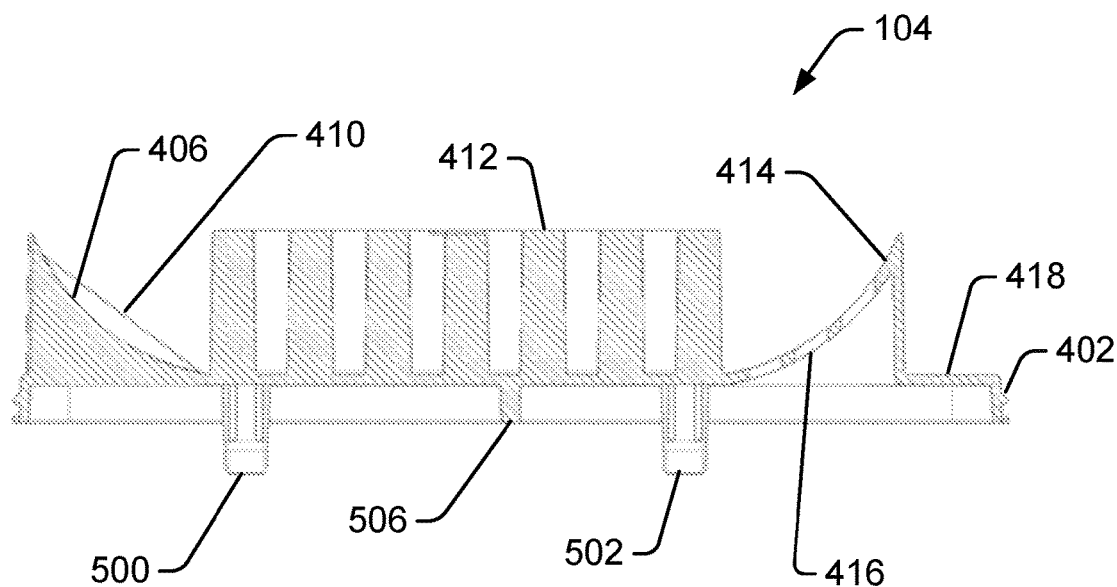
FIG. 7 is a cross-sectional side view of the lower portion of the particle trap for a gas meter.

FIG. 7 is a cross-sectional side view of the lower portion 104 of the particle trap for a gas meter.

Figure 8:
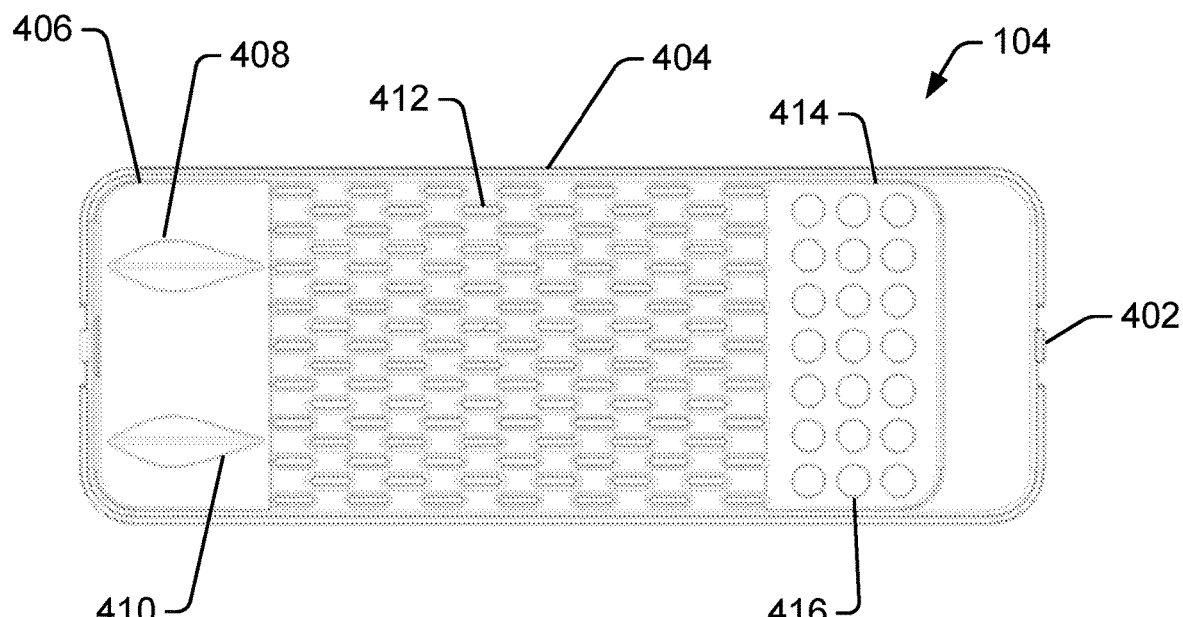
FIG. 8 is an orthographic top view of the lower portion of the particle trap for a gas meter.

FIG. 8 shows a top view of the lower portion 104 of the particle trap for a gas meter.

Figure 9:
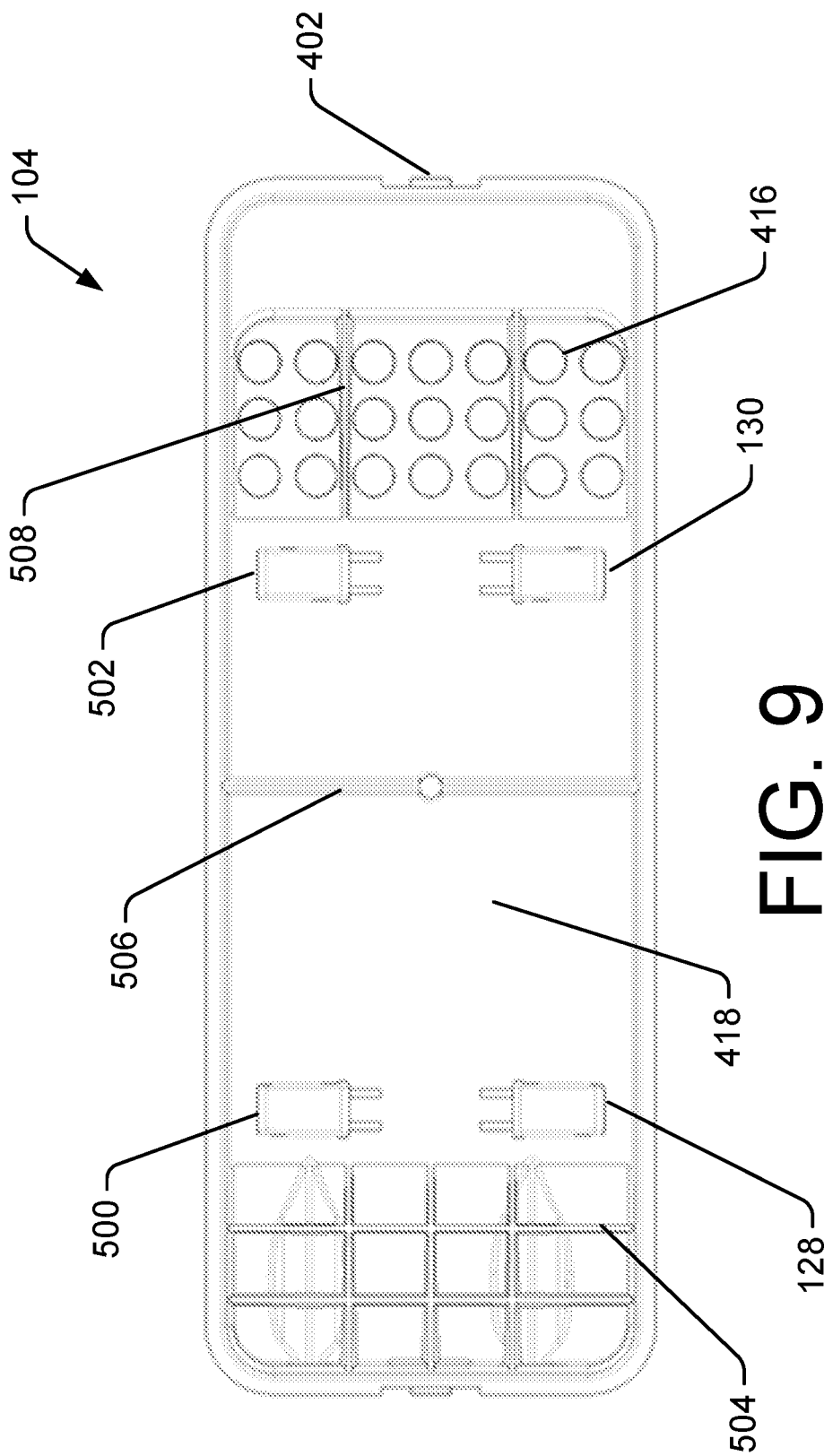
FIG. 9 is an orthographic bottom view of the lower portion of the particle trap for a gas meter.

FIG. 9 shows the bottom surfaces of the lower portion 104 of the particle trap for a gas meter.

Figure 10:
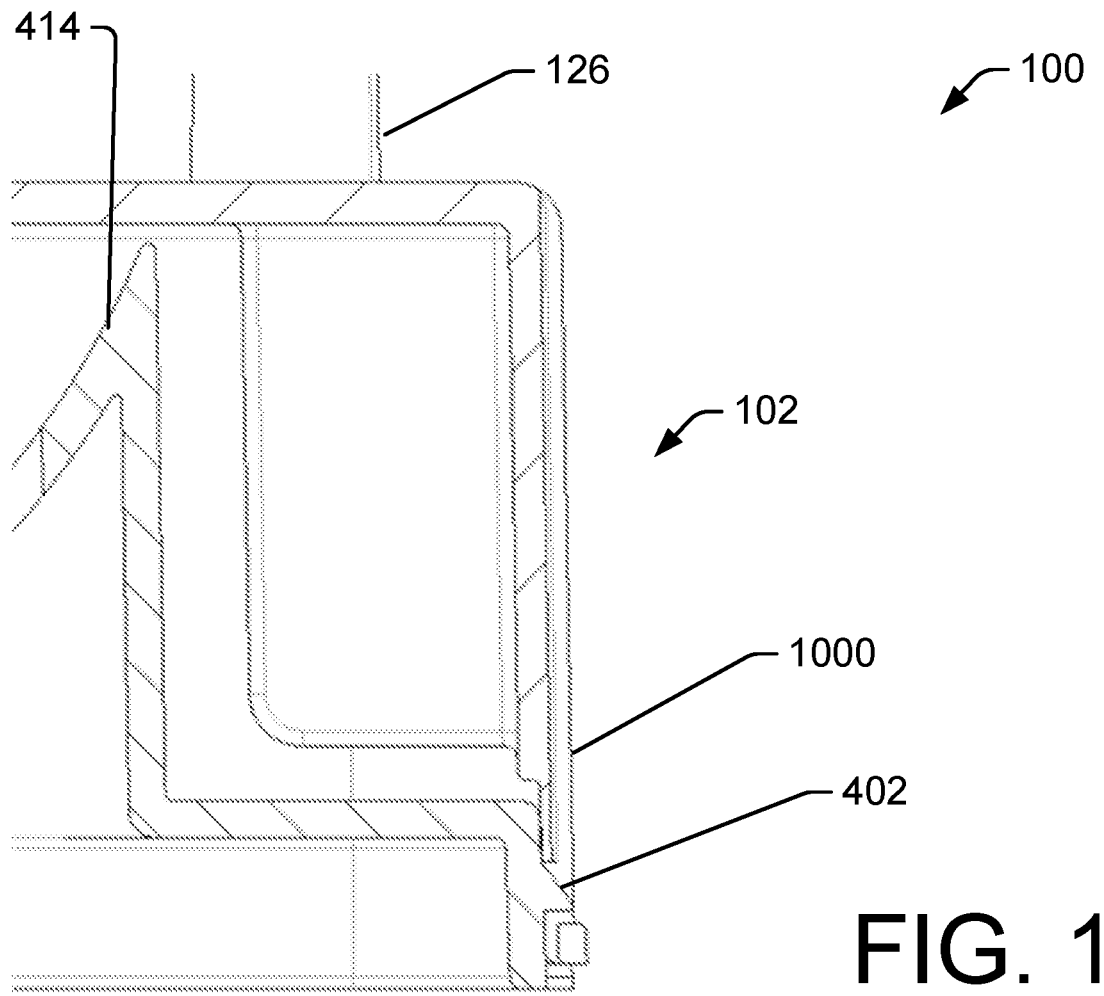
FIG. 10 is a cross-sectional view of example connector components attaching the upper and lower portions of the particle trap.

FIG. 10 is a cross-sectional view of example connector components attaching the upper portion 102 and lower portion 104 of the particle trap 100. In the example, a connector 402 is configured to "snap" into a slot or hole defined in a sidewall 1000 of the upper portion 102. Conversely, the connector could be carried on the upper portion and snap into a slot defined in a sidewall of the lower portion.

Figure 11:
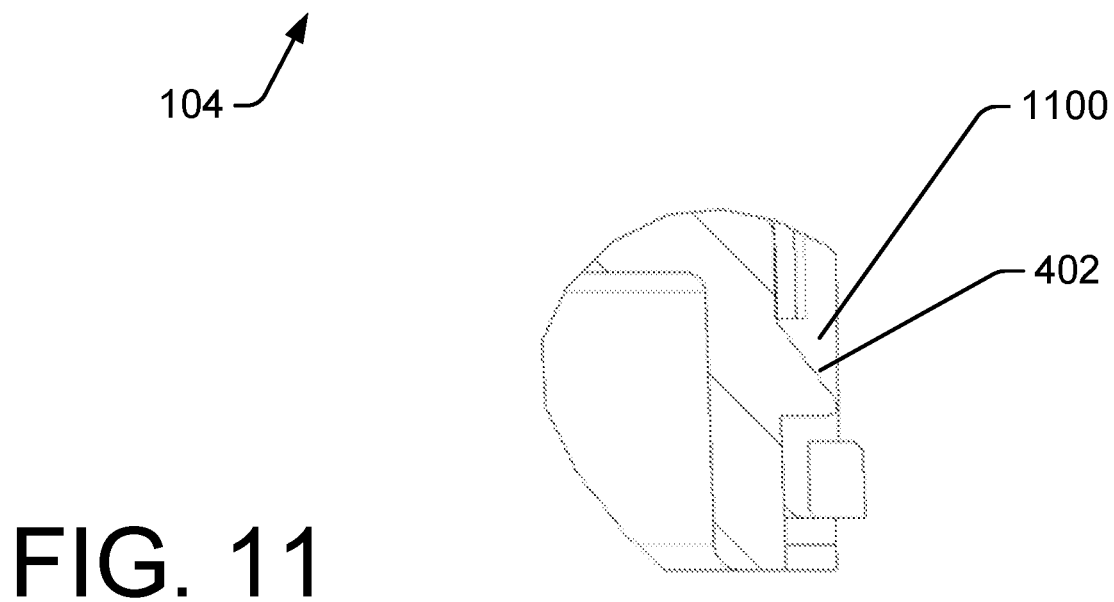
FIG. 11 is an enlarged cross-sectional view showing example detail of the connector components attaching the upper and lower portions of the particle trap.

FIG. 11 is an enlarged cross-sectional view showing example detail of the connector 402 of the lower portion inserted into the hole 1100 defined in the sidewall of the upper portion. In the example, one or both of the upper and lower portions are resiliently deformable, and slight deformation of one or both allows the connector tab to be inserted into the slot.

Figure 12:
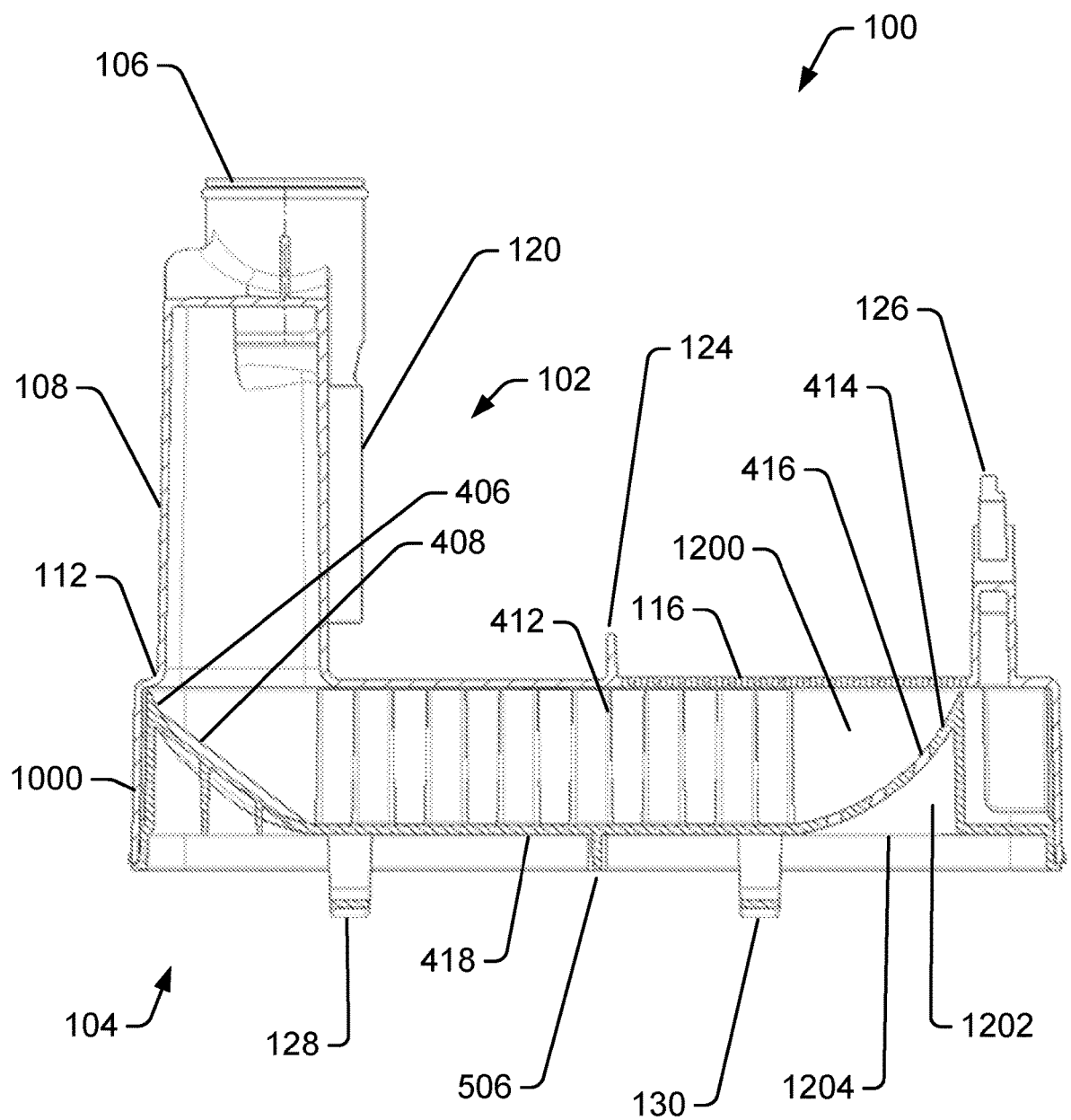
FIG. 12 is a cross-sectional view of the particle trap.

FIG. 12 is a cross-sectional view of a particle trap 100. In the example shown, gas enters the inlet pipe 106 and travels downwardly in parallel pipes 108, 110 (only 108 is visible). The gas flow is redirected by a first curved ramp 406 having a flow guide 408. Gas passes through the plurality of fingers 412, which tend to clean the gas by adhering to particles and/or causing particles to fall to the base 418 (other physical effects like drag and momentum, sedimentation, electrostatic adhesion or any other adhesion apply). The gas flow at location 1200 (bounded by the second curved ramp and a base 1204 of the lower portion) is bifurcated. Much of the gas flow redirected by the second curved ramp 414 passes through the holes 116 defined in the top of the upper portion 102. Some of the gas passes through the holes 416. Depending on design and manufacturing, gas may additionally exit the particle trap 100 by passing between a narrow gap between the upper portion 102 and the lower portion 104.

FIG. 13 is a cross-sectional view of a gas meter 1300, showing the particle trap 100 within an enclosure of the gas meter. In the example shown, the enclosure of the gas meter includes an upper portion 1302, a lower portion 1304 and a gas-tight seal 1306 that connects the upper and lower portions. An inlet pipe connection 1308 and an outlet pipe connection 1310 allow connection of input and output pipes. Within the gas meter 1300, a metrology unit 1312 receives gas, measures its quantity, and then sends the gas through a shutoff valve 1314.

FIG. 14 is a gas-flow diagram 1400, showing example gas flow through a particle filter 100, a metrology unit 1312 and a shutoff valve 1314 components of the meter.

Gas flow 1402 enters the gas meter at the gas inlet 1308. The gas flow moves into the pipe 106 of the particle filter. As seen in FIGS. 1-3, the flow moving through pipe 106 is bifurcated, with half of the flow passing through each of first and second flow pipes 108, 110. In the view shown, flow 1404 is the flow through pipe 108, which moves toward the particle filter 100. A corresponding flow would pass through pipe 110.

Gas flow 1406 is redirected approximately 90-degrees by the first curved ramp 406. The flow guides 408 tend to make the flow less turbulent and/or impart other desirable characteristics. The flow then proceeds within the particle trap, where it travels between the plurality of fingers 412.

Passing through the plurality of fingers 412, the flow tends to be separated from particles, dirt, dust, etc., which may adhere to the fingers or drop to the base of the particle trap.

The gas flow 1408 is then redirected by the second curved ramp 414, which directs the flow toward the plurality of holes 116 of the exhaust grill and the holes on the second ramp 416. The holes 116 are better seen in FIGS. 1-3, and allow gas to exit the particle trap 100, while still being contained within the enclosure (e.g., enclosure top 1302, enclosure bottom 1304, and enclosure gas-tight seal 1306) of the gas meter.

While the gas flow 1408 passes through the holes 116, another gas flow 1410A may pass through the holes 416 defined in the second ramp 414 and some gas may move about region 1202 of FIG. 12. A gas flow 1410B may flow in a region above the base 1304 of the enclosure. Such gas may drop particles, dust and dirt, to the bottom of the gas meter enclosure. A gas flow 1410C may flow through gaps 118 between the upper and lower portions 102, 104 of the device 100. This gas will become part of flow 1412.

The flow 1412, having exited the particle through the holes 116 and holes 416 moves within the enclosure of the gas meter. The flow 1414 shows that gas generally moves toward the opening of the metrology unit 1312.

Referring to FIG. 2, the passage 122 between the pipes 108, 110 allows gas to enter a metrology unit supported by the bracket 120. Accordingly, gas flow 1414 moves through the passage 122 and into the metrology unit 1312.

Gas flow 1416 moves through the metrology unit 1312, where its volume is measured. Gas flow 1418 exits the metrology unit and enters the shutoff valve 1314 (which is open, in the example of FIG. 14). Gas flow 1420 moves through the valve, and gas flow 1422 exits the meter. Gas flow 1422 may move through pipes in a residential or commercial site (not shown) where it is consumed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A decontamination device to remove particles from a gas flow, the decontamination device comprising:
   an upper portion, wherein the upper portion defines a plurality of openings;
   a lower portion, attached to the upper portion, wherein the lower portion comprises:
      a first curved ramp to redirect the gas flow to a redirected gas flow;
      a plurality of fingers, in a path of the redirected gas flow, to contact and remove particles in the redirected gas flow, wherein each of the plurality of fingers has a height, a length in a direction of the gas flow, and a width perpendicular to the gas flow, wherein the height is greater than the length, and the length is greater than the width; and
      a second curved ramp, within which at least one hole is defined, to bifurcate the gas flow into a first gas flow passing through the at least one hole and a second gas flow redirected by the second curved ramp to pass through the plurality of openings defined in the upper portion; and
   a gas passage defined within the upper portion and the lower portion within which the plurality of fingers is contained; and
   a first flow pipe and a second flow pipe to receive incoming gas from an inlet pipe and to bifurcate the gas flow redirected at the first curved ramp.

2. The decontamination device as recited in claim 1, additionally comprising:
   at least one flow guide located on the first curved ramp, wherein a length of the at least one flow guide is oriented in a direction of gas flow and the length is greater than a width of each of the at least one flow guide.

3. The decontamination device as recited in claim 1, additionally comprising:
a support bracket, connected to the first flow pipe and the second flow pipe of the upper portion of the decontamination device, to support a metrology unit.

4. The decontamination device as recited in claim 1, additionally comprising:
a gas pipe support stand of the decontamination device to support a conduit for gas passing through a shutoff valve.

5. The decontamination device as recited in claim 1, wherein:
the upper portion and the lower portion have corresponding upper and lower latching mechanisms to attach the upper portion to the lower portion.

6. The decontamination device as recited in claim 1, additionally comprising:
a gap defined between the upper portion and the lower portion to allow gas moving through the at least one hole defined in the second curved ramp to exit the decontamination device.

7. A decontamination device to remove particles from a gas flow, the decontamination device comprising:
an upper portion, wherein the upper portion defines a plurality of openings;
a lower portion, attached to the upper portion, wherein the lower portion comprises:
a first curved ramp to redirect the gas flow to a redirected gas flow;
at least one flow guide located on the first curved ramp;
a plurality of fingers, in a path of the redirected gas flow, to contact and remove particles in the redirected gas flow; and
a second curved ramp, within which at least one hole is defined, to bifurcate the gas flow into a first gas flow passing through the at least one hole and a second gas flow redirected by the second curved ramp to pass through the plurality of openings defined in the upper portion; and
a gas passage defined between the upper portion and the lower portion within which the plurality of fingers is contained.

8. The decontamination device as recited in claim 7, wherein a lengthwise axis of the at least one flow guide is substantially oriented in a direction of gas flow.

9. The decontamination device as recited in claim 7, additionally comprising:
a support bracket, connected to the upper portion, to support a metrology unit.

10. The decontamination device as recited in claim 7, additionally comprising:
a gas pipe support stand supported by an upper surface of the upper portion of the decontamination device to support a conduit for gas passing through a shutoff valve.

11. The decontamination device as recited in claim 7, wherein:
the upper portion and the lower portion have corresponding upper and lower latching mechanisms, respectively, to attach the upper portion to the lower portion.

12. The decontamination device as recited in claim 7, additionally comprising:
a gap defined between the upper portion and the lower portion to allow gas moving through the at least one hole defined in the second curved ramp to exit the decontamination device.

13. The decontamination device as recited in claim 7, additionally comprising:
a first flow pipe and a second flow pipe to receive incoming gas and to bifurcate the gas flow redirected at the first curved ramp.

14. A gas meter, comprising:
a metrology unit; and
a decontamination device to remove particles from a gas flow, the decontamination device comprising:
an upper portion, comprising:
a mounting bracket attached to the upper portion and supporting the metrology unit; and
a gas pipe support-stand to support a pipe connected to the metrology unit; and
a lower portion, comprising:
a first curved ramp to redirect the gas flow to a redirected gas flow;
a plurality of fingers, in a path of the redirected gas flow, to contact and remove particles in the redirected gas flow; and
a second curved ramp, to redirect at least part of the gas flow through a plurality of openings defined in the upper portion.

15. The gas meter as recited in claim 14, additionally comprising:
at least one flow guide located on the first curved ramp, wherein a lengthwise axis of the at least one flow guide is oriented in a direction of gas flow.

16. The gas meter as recited in claim 14, wherein each of the plurality of fingers has a height, a length in a direction of the gas flow, and a width perpendicular to the gas flow, wherein the height is greater than the length, and the length is greater than the width.

17. The gas meter as recited in claim 14, additionally comprising:
a gas pipe support stand, attached to the upper portion of the decontamination device, to support a conduit; and
a shutoff valve connected to the conduit.

18. The gas meter as recited in claim 14, wherein:
the upper portion and the lower portion have corresponding upper and lower latching mechanisms to attach the upper portion to the lower portion.

19. The gas meter as recited in claim 14, additionally comprising:
a gap defined between the upper portion and the lower portion to allow gas moving through at least one hole defined in the second curved ramp to exit the decontamination device.

20. The gas meter as recited in claim 14, additionally comprising:
an enclosure of the gas meter; and
a plurality of holes defined in the upper portion of the decontamination device to allow gas to exit the decontamination device and move within the enclosure of the gas meter.

* * * * *